June 28, 1932.   R. N. JOHNSTON   1,864,913
ARTICLE EXCHANGE MECHANISM
Filed Aug. 6, 1930   4 Sheets-Sheet 1

Inventor
ROBERT N. JOHNSTON

By
Attorney

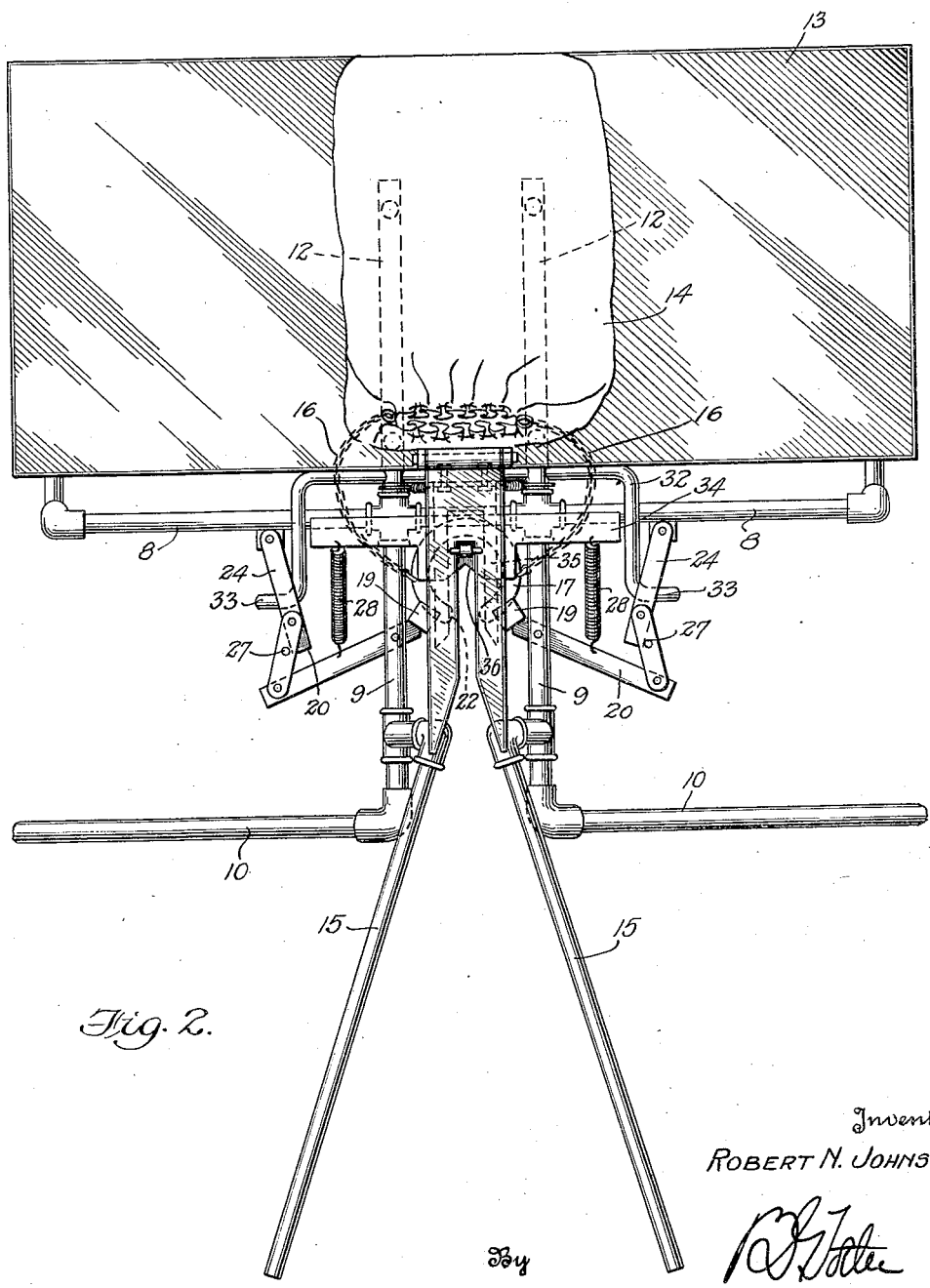

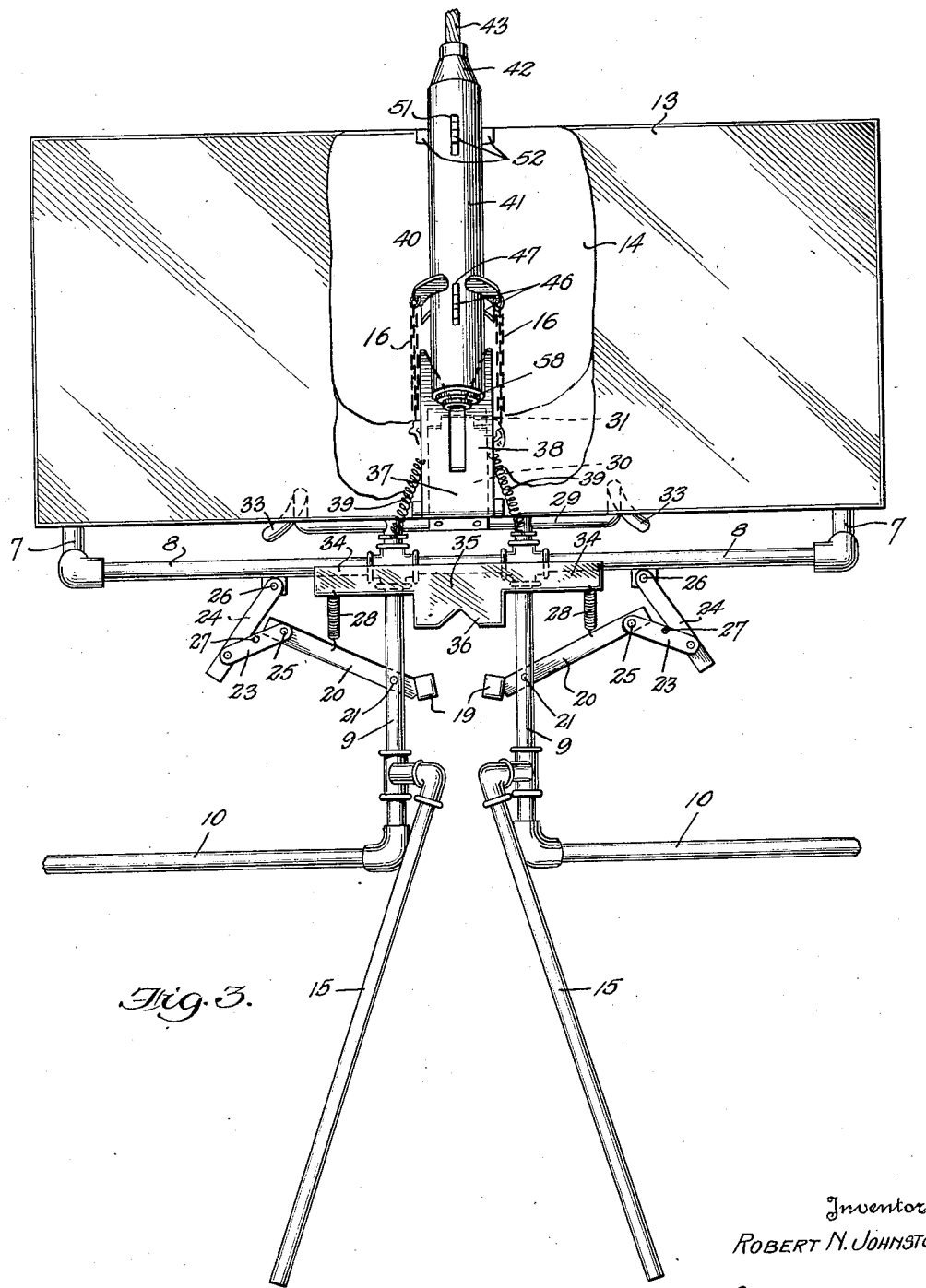

June 28, 1932.  R. N. JOHNSTON  1,864,913
ARTICLE EXCHANGE MECHANISM
Filed Aug. 6, 1930  4 Sheets-Sheet 4

Inventor
ROBERT N. JOHNSTON
By
Attorney

Patented June 28, 1932

1,864,913

UNITED STATES PATENT OFFICE

ROBERT N. JOHNSTON, OF LINDSBORG, KANSAS

ARTICLE EXCHANGE MECHANISM

Application filed August 6, 1930. Serial No. 473,436.

The object of the present invention is to provide a novel, relatively simple, and effective means for delivering articles, as for example, mail and packages, to airplanes and from airplanes to a ground station.

A further and important object is to so construct this means that it may be employed for exchanging the goods between a ground station and an airplane.

In the accompanying drawings:

Figure 2 is a top plan view of the ground station apparatus and with the parts in condition to make a delivery.

Figure 3 is a similar view showing the parts after the delivery has been made.

Figure 1:
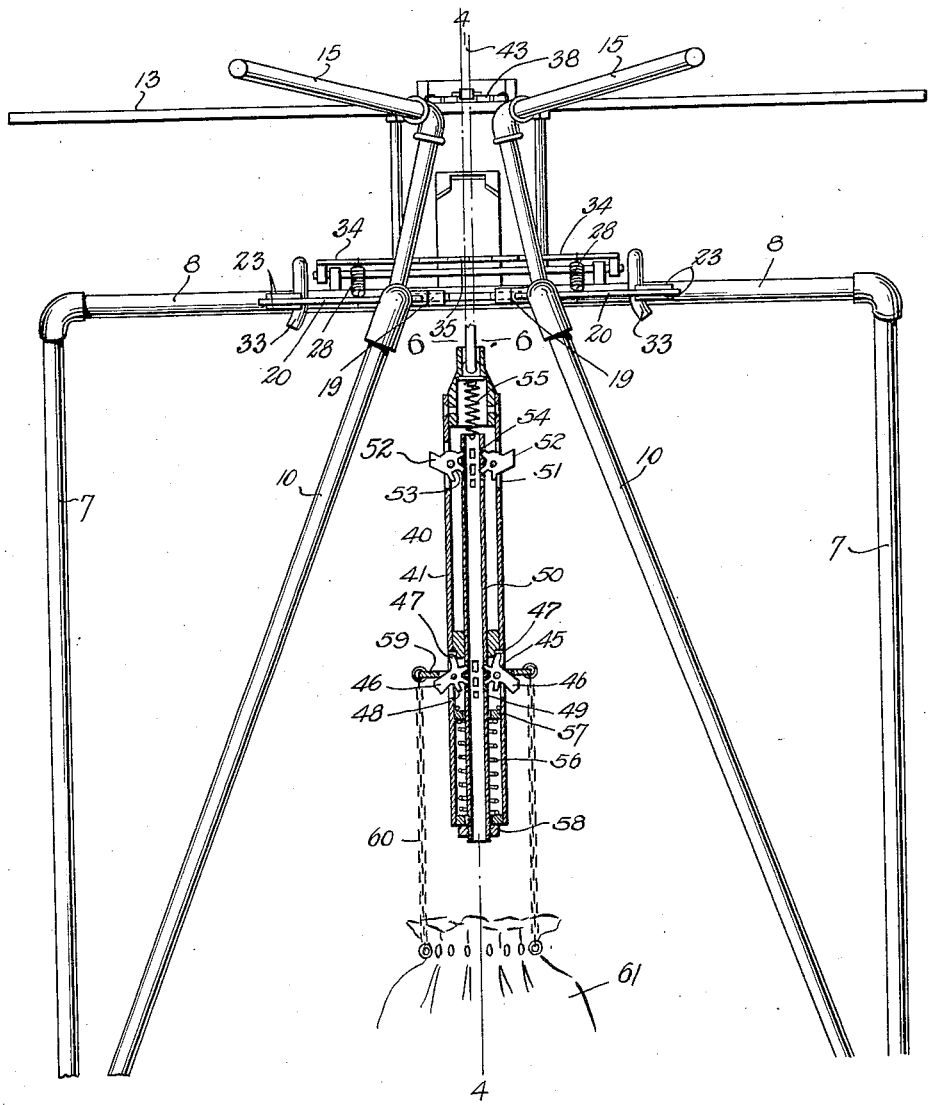
Figure 1 is a front elevation of the preferred embodiment of the invention, and showing the exchange or aerial device in section.
Figure 6:
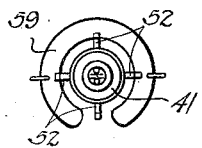
Figure 6 is a top plan view of the aerial device with one of the article-carrying yokes in place thereon, and may be considered as taken on the line 6—6 of Figure 1.

In the embodiment disclosed, a supporting frame is employed, preferably including rear legs 7 connected at their upper ends by a cross rod or bar 8. From this cross bar 8 extend forwardly projecting parallel rods or bars 9, the front ends of which are connected to divergent legs 10. It will be understood that the legs 7 and 10 are suitably anchored. Projecting rearwardly from the cross bar 8 are other parallel horizontal rods or frame bars 12, on which is supported a platform 13, this platform being intended to support the article that is to be delivered from the ground station. In the present instance, it is shown as a bag 14. The forwardly projecting bars 9 constitute an entrance throat for the exchange mechanism, and mounted on the front portions of said bars are forwardly divergent guide rods 15.

The bag or article to be delivered from the ground station to an airplane or other aerial transport is connected by chains or cables 16 with an article-carrying yoke 17. This yoke is detachably mounted at the rear end of the entrance throat formed by the rods 9, and is shown in position in Figures 1, 2 and 4. The mechanism for supporting it is as follows— The portion of the cross rod 8 between the side rods 9 is slotted in its front side, as shown at 18 (see Figures 4 and 5) to receive the rear side of said yoke 17. The front portion of the yoke is detachably engaged between jaws 19 carried on the inner ends of arms 20 pivoted at 21 on the side rods 9. The jaws can thus be swung inwardly to engage the opposite front portions of the yoke. This yoke, it will be noted, has an open side 22 which is placed forwardly, as indicated in Figure 2. In order to hold the jaws 19 in their operative positions, or in other words in engagement with the yoke, the outer ends of the arms 20 are each connected to one of a pair of toggle links 23—24. One of the links, as 23, is pivoted, as shown at 25, to the arm 20. The other link is pivoted at 26 on an adjacent portion of the supporting frame. The links are provided with suitable stops 27 that limit their movements in one direction and hold the jaws 19 in engagement with the yoke 17. Springs 28 are connected to said arms 20 and operate when the arms are freed to swing the jaws 19 away from the yoke 17.

For the purpose of breaking the toggles and permitting the springs 28 to operate, a trip device is employed, which includes a rock shaft 29 journaled on the frame behind the cross bar 8 and having an upstanding plate 30 secured thereto. The upper portion of this plate extends forwardly over the yoke, and is forked, as shown at 31. This rock shaft also carries forwardly extending arms 32 terminating in downturned cam fingers 33, which bear against the inner sides of the links 24 (see Figure 2). It will be evident that if the forked portion 31 is drawn upwardly, the cams 33 will act to swing the links 24 outwardly until they are past the "dead center", whereupon the springs 28 can act and swing the jaws 19 outwardly. The springs 28 are connected to the outer ends of a tension plate 34 that is located between the supporting means for the yoke 17 and the forked portion 31 of the plate 30. This tension plate 34 has a central forwardly projecting extension 35 that is notched, as shown at 36, this portion lying just above the yoke. When the plate 34 is swung upwardly, it obviously puts additional tension on the springs 28.

Mounted on the forward edge of the platform and directly above the forked portion 31 of the plate 30, is a forwardly extending baffle plate 37, whose forward portion is also forked, as shown at 38. This plate 37 is normally held downwardly, or in horizontal position by a coiled spring 39.

The exchange device, and which may be entitled the "aerial member", is in the form of an elongated head 40. It consists of a tubular body 41 having a tapered upper end portion 42 connected to a cable 43, which is suitably fastened to a frame, or is by any other means connected to an airplane or like transport.

The body has its lower portion longitudinally slotted, as shown at 44, and pivotally mounted in said body, are supporting finger members 45 having fingers 46 and 47 adapted to alternately be projected beyond the body, accordingly as the members 45 are turned. These members 45 have gear segments 48 on their inner sides engaged with racks 49 formed in a reciprocatory tubular rack bar 50 that is mounted in the body 41. In the upper end of the tubular body 41 are longitudinal slots 51 from which project pivotally mounted trip fingers 52 having on their inner sides gear segments 53 engaged in rack portions 54 formed in the upper end of the tubular rack bar 50. A spring 55 bears on the upper end of the rack bar 50 to urge it downwardly. Another spring 56, surrounding the lower end of the rack bar, is abutted against an internal collar 57 fixed in the body 51 and against a plunger 58 secured to the lower end of the rack bar 50 and slidable in the lower end of the body. The rack bar 50 is thus urged downwardly to cause the fingers 46 and 52 to normally maintain a projecting relation. But it is obvious that if sufficient downward force is directed against the trip fingers 52, the rack bar 50 will be raised within the body 41, causing the fingers 46 to move downwardly, and at the same time causing the fingers 47 to be projected.

For the purpose of delivering articles from the aerial transport to the ground station, a second yoke 59 is employed, which corresponds to the yoke 17 already described. This yoke 59 is connected by chains or cables 60 to a bag 61 or other container, and is detachably mounted on the aerial device 40 by embracing the same and being supported by the fingers 46.

Figure 4:
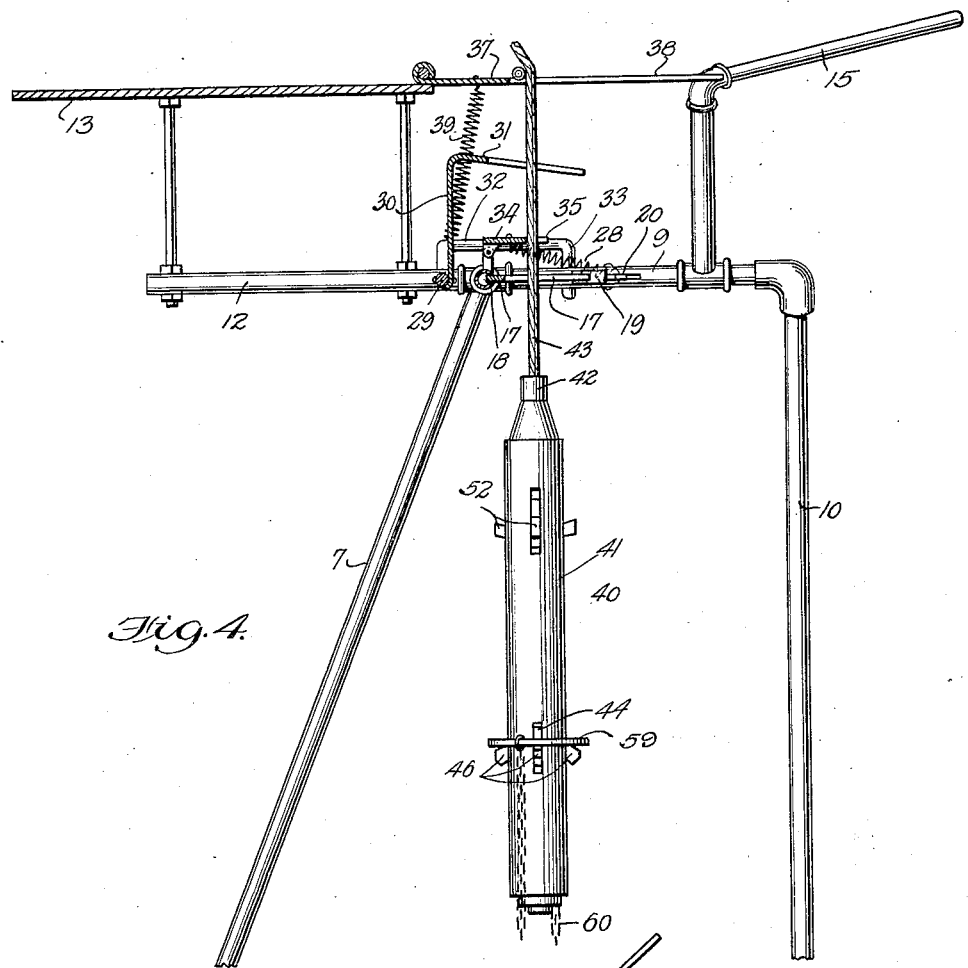
Figure 4 is a vertical sectional view on the line 4—4 of Figure 1.
Figure 5:
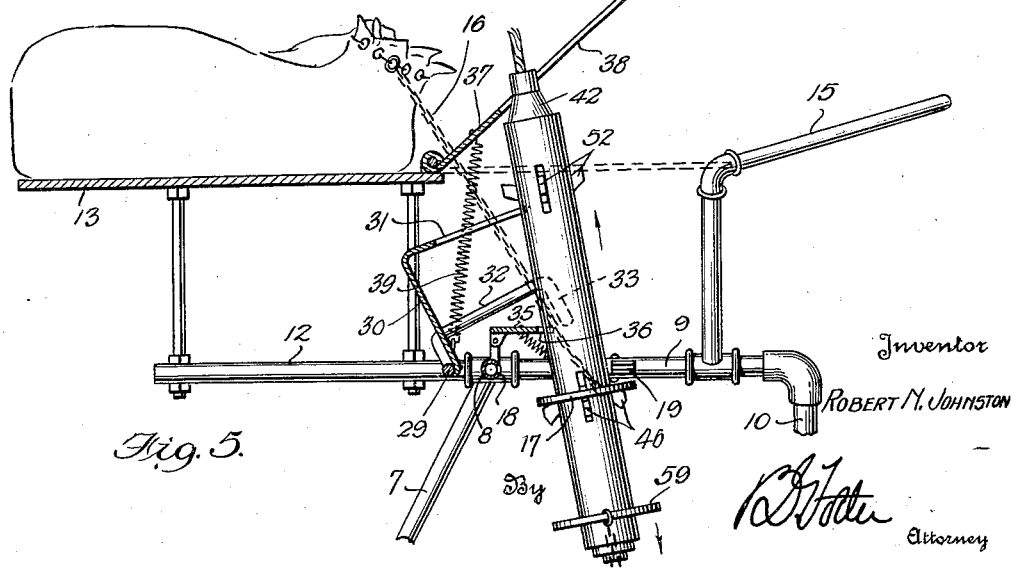
Figure 5 is a view similar to Figure 4, but illustrating the parts as an exchange is taking place.

It is believed that the operation of the apparatus can now be explained. Assuming that an exchange is to take place, or in other words, that a bag of mail is to be delivered from the ground station to an airplane, and that similarly a bag of mail is to be delivered from the airplane to the ground station, at the ground station the bag 14 connected to the yoke 17 is placed on the platform 13 and the yoke 17 mounted in the mechanism and in the manner described above. The parts are then in the position shown in Figure 2. The operator on the airplane has also mounted the bag 61 to be delivered to the ground station by suspending it through the medium of the yoke 59 on the fingers 46 of the aerial device 40. The pilot, with the bag 61 and the aerial device 40 suspended from the airplane, so directs the latter that the cable 43 enters the guideway formed by the arms 15 and frame bars 9, with the aerial device 40 below the yoke 17, or as represented in Figures 1 and 4. As the airplane passes, obviously the aerial device 40 will be drawn upwardly when the cable 43 reaches the rear of the guideway between the frame bars 9. When this takes place, and as illustrated in Figure 5, the head 42 of the aerial device will first strike the tension plate 35 and swing it upwardly, thereby putting tension on the springs 28 which operate the jaws 17. A continued movement causes said head 42 to engage in the fork 31 of the plate 30, thereby rocking the shaft 29, swinging the arm 32 upwardly, and causing the cams 33 to break the toggles 23—24, thereby permitting the tensioned springs 28 to act and release the yoke 17. The upper end of the aerial device having slipped into this yoke, starts to elevate it and the yoke 17 operating on the trip fingers 52 will swing the same, thereby elevating the rack bar 50, swinging downwardly and inwardly the fingers 46, releasing the yoke 59 and allowing the bag 61 to be deposited at the ground station. Upon the inward movement of the fingers 46, the fingers 47 will obviously be projected and the yoke 17 slipping past the trip fingers 52, will become engaged with and supported by the fingers 47 so that the bag 14 of the ground station is now supported on the aerial device, and they can be elevated up to the airplane and removed by an operator on the airplane. In this exchanging operation, and as shown in Figure 5, the plate 37 acts as a baffle which tends to swing the aerial device 40 outwardly from the mechanism beneath the trip plate 37 and insure the passage of the aerial device 40 through the mechanism without being caught or creating injury.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. In article exchange mechanism, the combination with an article carrying yoke, of a mounting for the same including a jaw that is movable to and from engagement with the yoke, toggle links for holding the jaw in such engagement, a trip for moving the links to release the yoke from the jaw, and an aerial device for carrying off the yoke and operating the trip.

2. In article exchange mechanism, the combination with an article carrying yoke, of a mounting for the same including a jaw that is movable to and from engagement with the yoke, toggle links for holding the jaw in such engagement, a trip movably mounted above the yoke and having a cam member for swinging the toggles to release the yoke from the jaw, and an aerial device that engages the yoke to carry it off and engages the trip to operate it and release the yoke from the jaw.

3. In article exchange mechanism, the combination with a support, of an article carrying yoke, means for detachably mounting the yoke on the support including a pair of pivotally mounted jaws that detachably engage the yoke at separated points, sets of toggle links engaged with the jaws to hold them in their said engaged positions, and an upwardly swinging trip located above the yoke and jaws and having cams that engage the toggle links to move them and cause the jaws to move away from the yoke.

4. In article exchange mechanism, the combination with a support, of an article carrying yoke, means for detachably mounting the yoke on the support including a pair of pivotally mounted jaws that detachably engage the yoke at separated points, sets of toggle links engaged with the jaws to hold them in their said engaged positions, an upwardly swinging trip located above the yoke and jaws and having cams that engage the toggle links to move them and cause the jaws to move away from the yoke, and an aerial head having means for engaging the yoke to carry it out of the support and for engaging the trip to swing it.

5. In an article exchange mechanism, the combination with an article carrying yoke, of means for detachably supporting the yoke, an aerial device for engaging the yoke and removing it from the supporting means, and an upwardly movable baffle above and spaced from the yoke supporting means and engaged by the aerial device on its movement for guiding the aerial device.

6. In an article exchange mechanism, the combination with an article carrying yoke, of means for detachably supporting the yoke, an aerial device for engaging the yoke and removing it from the supporting means, and a baffle plate pivotally and yieldingly mounted above the yoke and engaged by the aerial device on its movement for guiding the aerial device.

7. In an article exchange mechanism, the combination with a support having a guideway and a socket at the rear end of the guideway, of an article carrying yoke that detachably engages in the socket and projects into the guideway, holding jaws that detachably engage opposite sides of the yoke, toggles comprising pivotally connected links that are connected to the jaws for holding them in engagement with the yoke, and moving them out of such engagement, a forked trip device having cams that engage the toggles to break the same and move the jaws to inoperative positions, a forked baffle pivoted between the trip device and yoke, and an aerial transfer head that is movable into the yoke and engages the baffle and trip device to operate the latter and be guided by the former.

8. In an article exchange mechanism, the combination with a support, of a yoke that is detachably mounted in the support, an aerial head that is movable into the yoke to detach it from the support, a second yoke that detachably embraces the head, means for detachably holding the second yoke on the head, and means engaged by the first yoke when it becomes associated with the head for releasing the second yoke from the holding means.

9. In an article exchange mechanism, the combination with a support, of a yoke that is detachably mounted in the support, an aerial head that is movable into the yoke to detach it from the support, a second yoke that detachably embraces the head, holding fingers movably mounted on the head for detachably holding the second yoke on said head, and means on the head engaged by the first yoke when it becomes associated with the head for releasing the second yoke from the holding means.

10. In an article exchange mechanism, the combination with a support, of a yoke that is detachably mounted in the support, an aerial head that is movable into the yoke to detach it from the support, a second yoke that detachably embraces the head, holding finger members movably mounted on the head and projecting therefrom to form supports for the second yoke, and trip means movably mounted on the head above the fingers and connected to the latter to move the same and release the second yoke, said trip means being engaged and operated by the first yoke when it encircles the head.

11. In an article exchange mechanism, the combination with a support, of a yoke that is detachably mounted in the support, an aerial head that is movable into the yoke to detach it from the support, a second yoke that detachably embraces the head, holding finger members movably mounted on the head and projecting therefrom to form supports for the second yoke, and trip means movably mounted on the head above the fingers and connected to the latter to move the same and release the second yoke, said trip means being engaged and operated by the first yoke when it encircles the head, and said finger members operating to allow the first yoke to pass and become engaged by the finger members.

12. In an article exchange mechanism, the combination with a support, of a yoke that is detachably mounted in the support, an aerial head that is movable into the yoke to detach it from the support, and a second yoke that embraces the head and is removable therefrom, said head comprising an elongated tubular body supporting fingers pivotally mounted on the body and projecting therefrom below the second yoke to normally support it, trip fingers pivotally mounted on the body above the supporting fingers and adapted to be engaged and operated by the first yoke, and means within the body and connecting the trip and supporting fingers to cause the former to operate the latter.

13. In an article exchange mechanism, the combination with a support, of a yoke that is detachably mounted in the support, an aerial head that is movable into the yoke to detach it from the support, and a second yoke that embraces the head and is removable therefrom, said head comprising an elongated tubular body supporting fingers pivotally mounted on the body and projecting therefrom below the second yoke to normally support it, trip fingers pivotally mounted on the body above the supporting fingers and adapted to be engaged and operated by the first yoke, and means within the body and connecting the trip and supporting fingers to cause the former to operate the latter, and spring means returning the fingers to their operative positions, said trip fingers permitting the passage of the first yoke past the same to the supporting fingers.

In testimony whereof, I affix my signature.

ROBERT N. JOHNSTON.